US008098840B2

(12) United States Patent
Ku

(10) Patent No.: US 8,098,840 B2
(45) Date of Patent: Jan. 17, 2012

(54) MULTI-CHANNEL OUTPUT DEVICE FOR A MULTIMEDIA DEVICE

(75) Inventor: Chiung-Ching Ku, Hsinchu County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 595 days.

(21) Appl. No.: 12/342,074

(22) Filed: Dec. 23, 2008

(65) Prior Publication Data

US 2010/0111321 A1 May 6, 2010

(30) Foreign Application Priority Data

Nov. 5, 2008 (TW) ................................ 97142616 A

(51) Int. Cl.
*H04B 3/00* (2006.01)

(52) U.S. Cl. .............. 381/81; 381/82; 381/123; 381/22; 330/88; 330/98

(58) Field of Classification Search .................... 381/81, 381/22, 123, 82; 330/88, 98
See application file for complete search history.

(56) References Cited

U.S. PATENT DOCUMENTS

| | | | | |
|---|---|---|---|---|
| 3,626,097 A * | 12/1971 | Bloom et al. | .................... | 381/80 |
| 4,683,591 A * | 7/1987 | Dawson et al. | .................. | 381/85 |
| 7,929,718 B1 * | 4/2011 | Gephardt et al. | ............. | 381/120 |
| 2008/0226101 A1 * | 9/2008 | Silber et al. | .................... | 381/123 |
| 2009/0016539 A1 * | 1/2009 | Watanabe | ........................ | 381/22 |

* cited by examiner

*Primary Examiner* — Thinh T Nguyen
(74) *Attorney, Agent, or Firm* — Winston Hsu; Scott Margo

(57) ABSTRACT

A multi-channel output device for a multimedia device includes a plurality of reception ends, an amplifier having an input end and an output end, a plurality of sound output devices for outputting sound, a first switching unit coupled between the plurality of reception ends and the input end of the amplifier for coupling a reception end of the plurality of reception ends to the input end of the amplifier according to a control signal, a second switching unit coupled between the output end of the amplifier and the plurality of sound output devices for coupling the output end of the amplifier to a sound output device of the plurality of sound output devices according to the control signal, and a control unit coupled to the first switching unit and the second switching unit for outputting the control signal.

8 Claims, 4 Drawing Sheets

MULTI-CHANNEL OUTPUT DEVICE FOR A MULTIMEDIA DEVICE

BACKGROUND OF THE INVENTION

1. Field of the Invention

The present invention relates a multi-channel output device for a multimedia device, and more particularly, to a multi-channel output device capable of cutting cost, shrinking chip size, and reducing power consumption.

2. Description of the Prior Art

As a significant progress has been made in multimedia technology, an audio output technology has evolved from mono to stereo or surrounding sound, to provide more entertainment for people. However, the multi-channel output cause more resource consumption. As a result, cost reduction of the multi-channel output has been a main goal in the industry.

Take stereo for example, please refer to FIG. 1, which is a schematic diagram of a stereo output structure 10. The stereo output structure 10 includes amplifiers 100, 102 and speakers 104, 106. The amplifiers 100, 102 are respectively driven by voltage sources VDD1, VDD2 and −VSS, and used for amplifying stereo signals IN_R, IN_L to generate amplifying results OUT_R, OUT_L for the speakers 104, 106. The voltage sources VDD1, VDD2 and −VSS are provided by a power supply (not shown in FIG. 1), such as a charge pump. The stereo signals IN_R, IN_L are, respectively, left-channel signal and right-channel signal output by an audio processor (not shown in FIG. 1).

Thus, as shown in FIG. 1, to correctly process the stereo signals IN_R, IN_L, the stereo output structure 10 needs to amplify the stereo signals IN_R, IN_L through the amplifiers 100, 102, respectively, to play correct contents of the left and right channels. In other words, for the purpose of stereo, the stereo output structure 10 needs two amplifiers 100, 102, which causes cost increase, larger chip size, and more power consumption. Moreover, such issue will get severer as the number of channels increases (e.g. 4 channels, 5.1 channels, etc.). Thus, the stereo output structure in the prior art needs to be improved.

SUMMARY OF THE INVENTION

It is therefore an objective of the present invention to provide a multi-channel output device for a multimedia device.

The present invention discloses a multi-channel output device for a multimedia device. The multi-channel output device includes a plurality of reception ends, an amplifier, a plurality of sound output devices, a first switching unit, a second switching unit and a control unit. The plurality of reception ends are used for receiving a plurality of sound signals. The amplifier includes an input end and an output end and is used for amplifying signals received by the input end and outputting amplified signals from the output end. The plurality of sound output devices are used for outputting sound according to received signals. The first switching unit is coupled between the plurality of reception ends and the input end of the amplifier and used for coupling a reception end of the plurality of reception ends to the input end of the amplifier according to a control signal. The second switching unit is coupled between the output end of the amplifier and the plurality of sound output devices and used for coupling the output end of the amplifier to a sound output device of the plurality of sound output devices according to the control signal. The control unit is coupled to the first switching unit and the second switching unit, and used for outputting the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
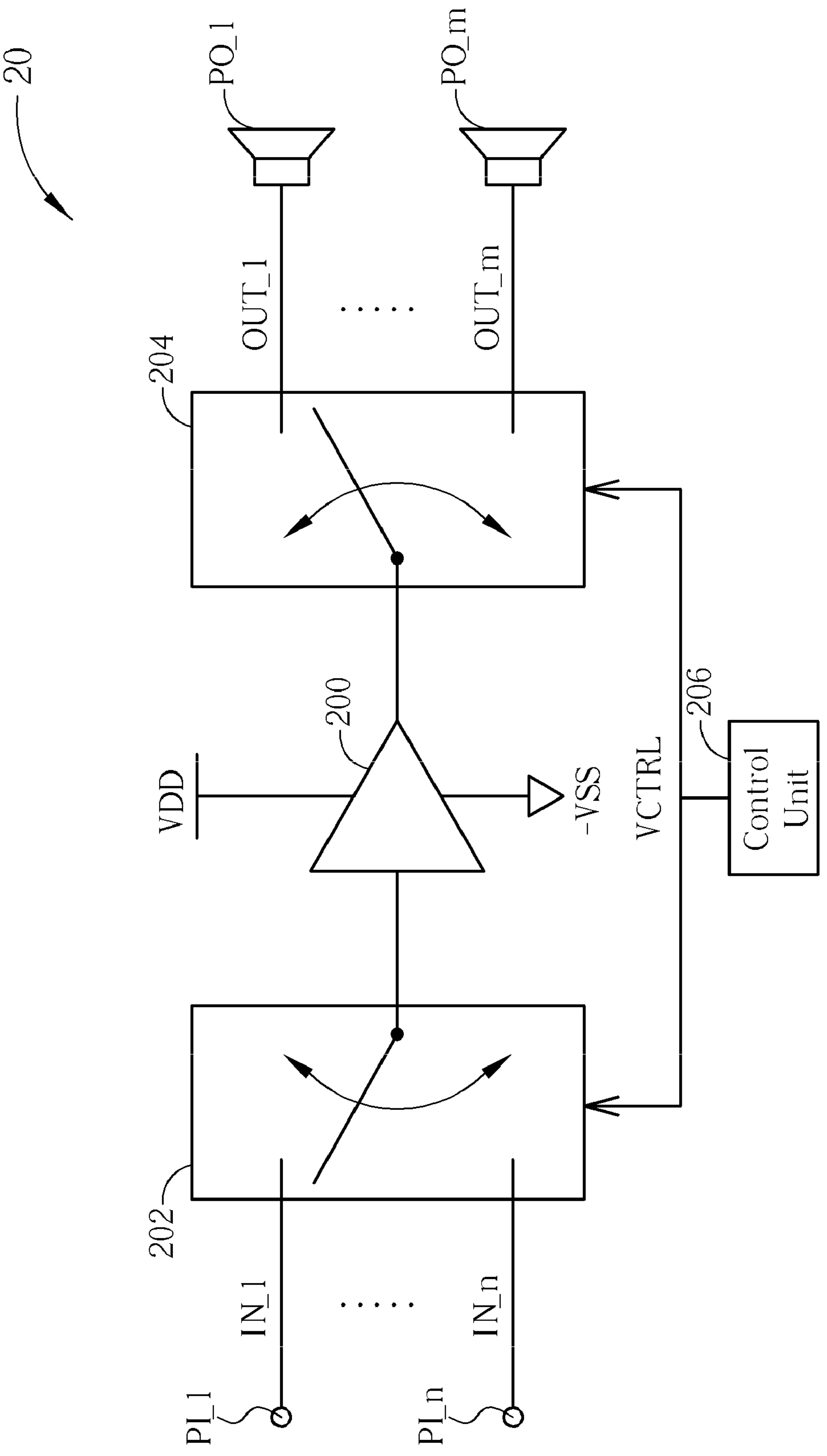
FIG. 2 is a schematic diagram of a multi-channel output device according to an embodiment of the present invention.

Please refer to FIG. 2, which is a schematic diagram of a multi-channel output device 20 according to an embodiment of the present invention. The multi-channel output device 20 is applied to a multimedia device (e.g. headphones or home theater systems), and can reduce production cost. The multi-channel output device 20 includes reception ends PI_1-PI_n, an amplifier 200, sound output devices PO_1-PO_m, a first switching unit 202, a second switching unit 204 and a control unit 206. The reception ends PI_1-PI_n are used for receiving sound signals IN_1-IN_n output from an audio processor of the multimedia device. The sound signals IN_1-IN_n are corresponding to different channels. The first switching device 202 is coupled between the reception ends PI_1-PI_n and the input end of the amplifier 200, and used for coupling a reception end PI_x of the reception ends PI_1-PI_n to the input end of the amplifier 200 according to a control signal VCTRL, generated by the control unit 206, in order to transmit a sound signal IN_x, received by the reception end PI_x, to the input end of the amplifier 200. The amplifier 200 is driven by voltage sources VDD and −Vss, and used for amplifying received signals and outputting amplifying results OUT_1-OUT_m in sequence. The second switching unit 204 is used for coupling the output end of the amplifier 200 to a sound output device PO_y of the sound output devices PO_1-PO_m according to the control signal VCRTL in order to transmit the amplifying result OUT_y, output from the amplifier 200, to the corresponding sound output device PO_y, so as to output sound through the sound output device PO_y.

To put it simply, in the multi-channel output device 20, the control unit 206 controls switching statuses of the first switching unit 202 and the second switching unit 204 through the control signal VCTRL for the purpose of multi-input and multi-output. In this situation, the multi-channel output device 20 only needs a single amplifier 200 rather than a plurality of amplifiers as in the prior art. Consequently, apart from cost and chip size reduction, the present invention reduces power consumption due to a single amplifier required.

Please note that the multi-channel output device 20 shown in FIG. 2 is an embodiment of the present invention, and can be modified by those skilled in the art. For example, the sound output devices PO_1-PO_m are, preferably, speakers and the amount “m” could be equal or unequal to the amount n of the reception ends PI_1-PI_n. If the amount m is equal to the amount n, the relationship between the outputs and the inputs is one to one mapping, such that the control unit 206 should control the first switching unit 202 and the second switching unit 204 to sequentially output the amplifying result OUT_1 of the sound signal IN_1 to the sound output device PO_1, and output the amplifying result OUT_2 of the sound signal IN_2 to the sound output device PO_2, and so on. On the contrary, if the amount m is not equal to the amount n, the relationship between the outputs and the inputs is not one to one mapping. For example, if n=2, m=4, then the multi-channel output device 20 can convert stereo into four-channel surrounding sound. Thus, the control unit 206 controls the first switching unit 202 and the second switching unit 204 to output the amplifying result OUT_1 of the sound signal IN_1 to the sound output devices PO_1, PO_2, and output the amplifying result OUT_2 of the sound signal IN_2 to the sound output devices PO_3, PO_4. Moreover, if n=4, m=2, then the multi-channel output device 20 can convert four-channel surrounding sound into stereo. Thus, the control unit 206 controls the first switching unit 202 and the second switching unit 204 to output the amplifying results OUT_1, OUT_2 of the sound signals IN_1, IN_2 to the sound output device PO_1, and output the amplifying results OUT_3, OUT_4 of the sound signals IN_3, IN_4 to the sound output device PO_2. The abovementioned examples are used for stating operation of the embodiment of the present invention. In practice, the multi-channel output device 20 can be modified by those skilled in the art based on system requirement.

Therefore, switching outputs and corresponding inputs via the first switching unit 202 and the second switching unit 204, the multi-channel output device 20 uses only the single amplifier 200 to realize multi-channel output. As a result, cost reduction, smaller chip size, and power saving can be achieved. Further more, the present invention can set switching frequencies of the first switching unit 202 and the second switching unit 204 greater than a maximum value (e.g. 20 KHz) that human ears can distinguish, to prevent hearing discrete noise. In other words, as long as the switching frequencies of the first switching unit 202 and the second switching unit 204 are greater than the maximum frequency that human ears can distinguish, sound output from the sound output devices PO_1-PO_m is continuous for human ears. Thus, quality of sound output from the sound output devices is improved.

Figure 1:
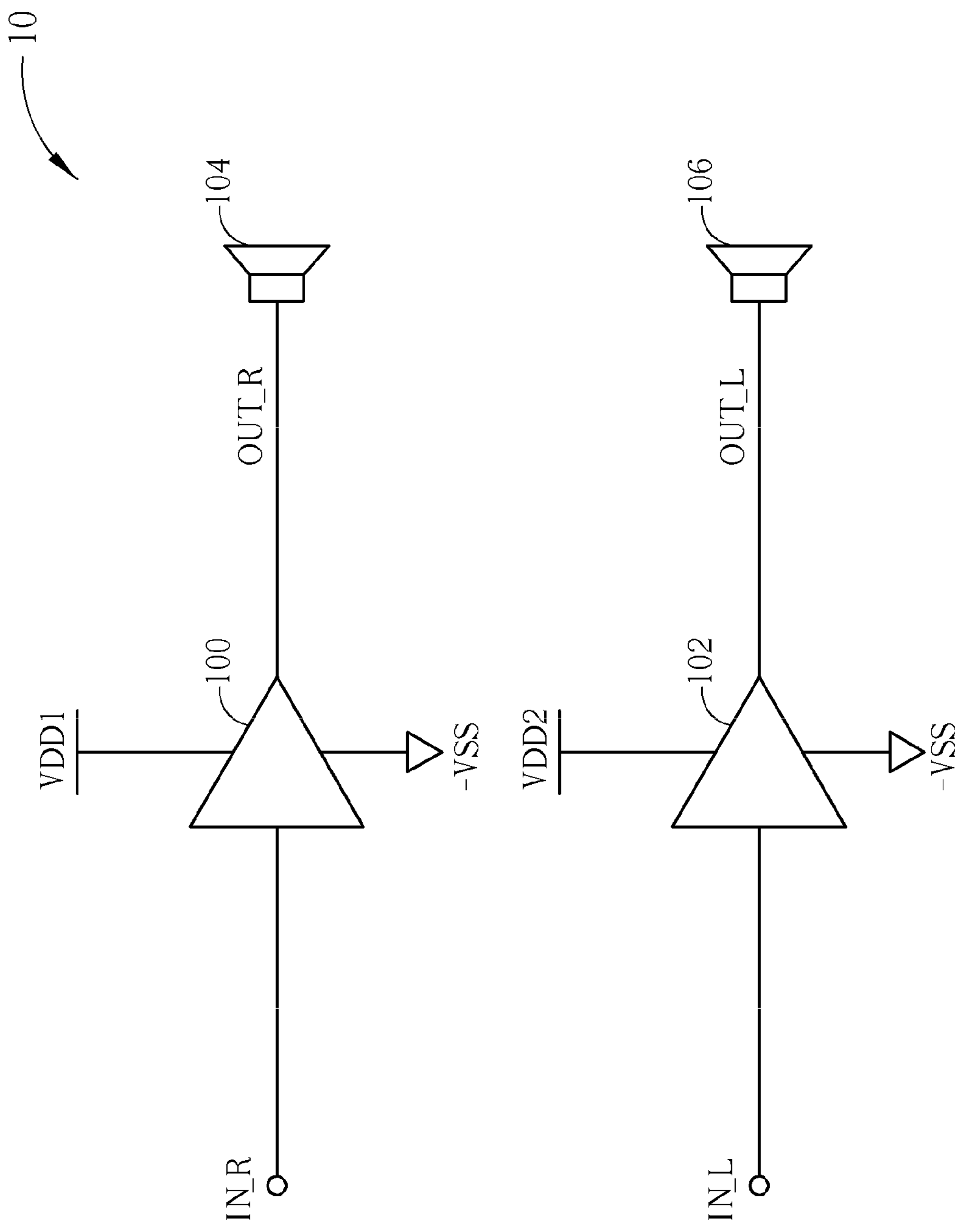
FIG. 1 PRIOR ART
FIG. 1 is a schematic diagram of a stereo output structure according to the prior art.
Figure 3:
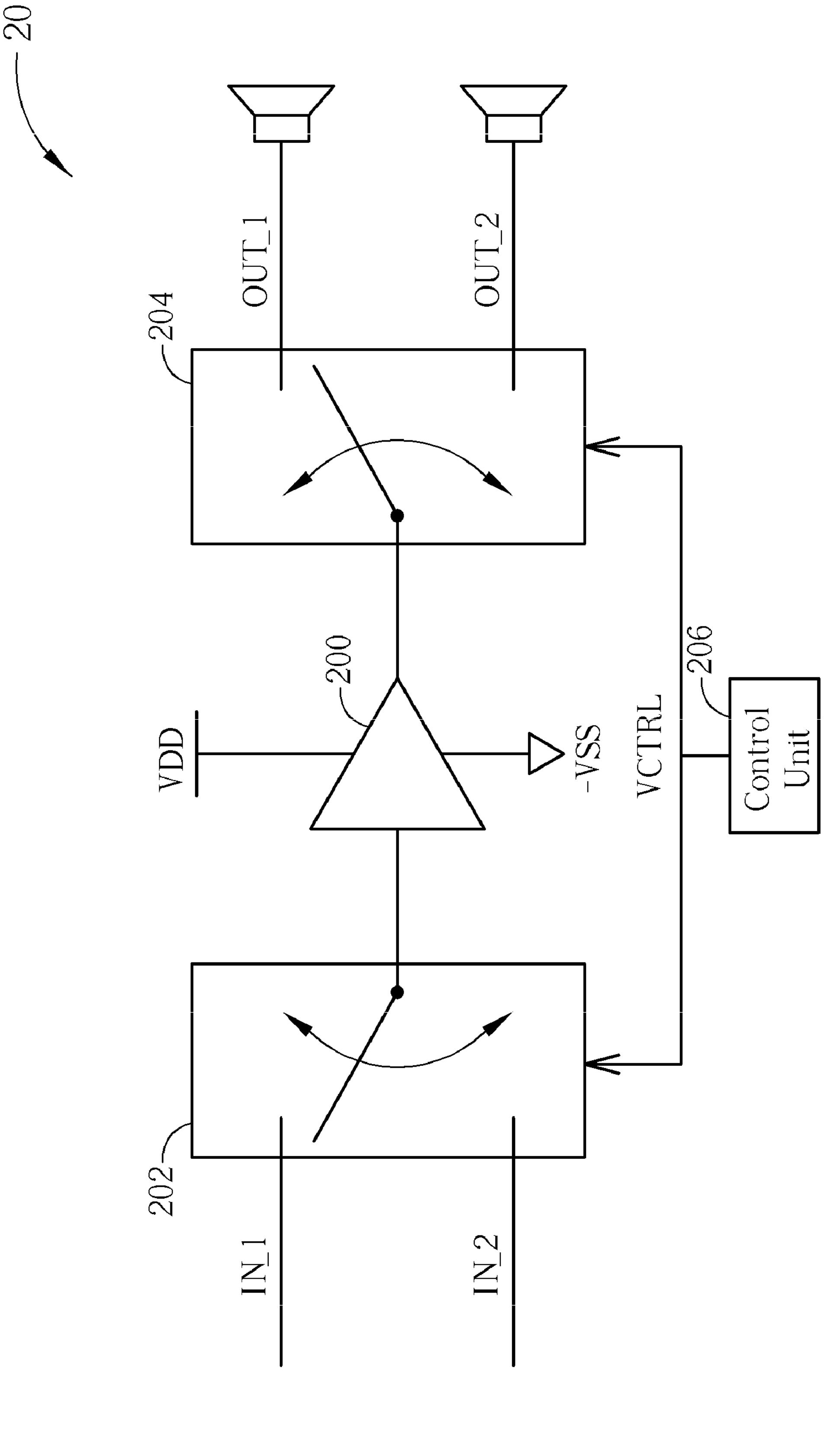
FIG. 3 is a schematic diagram when the multi-channel output device shown in FIG. 2 is used for a stereo application according to an embodiment of the present invention.
Figure 4:
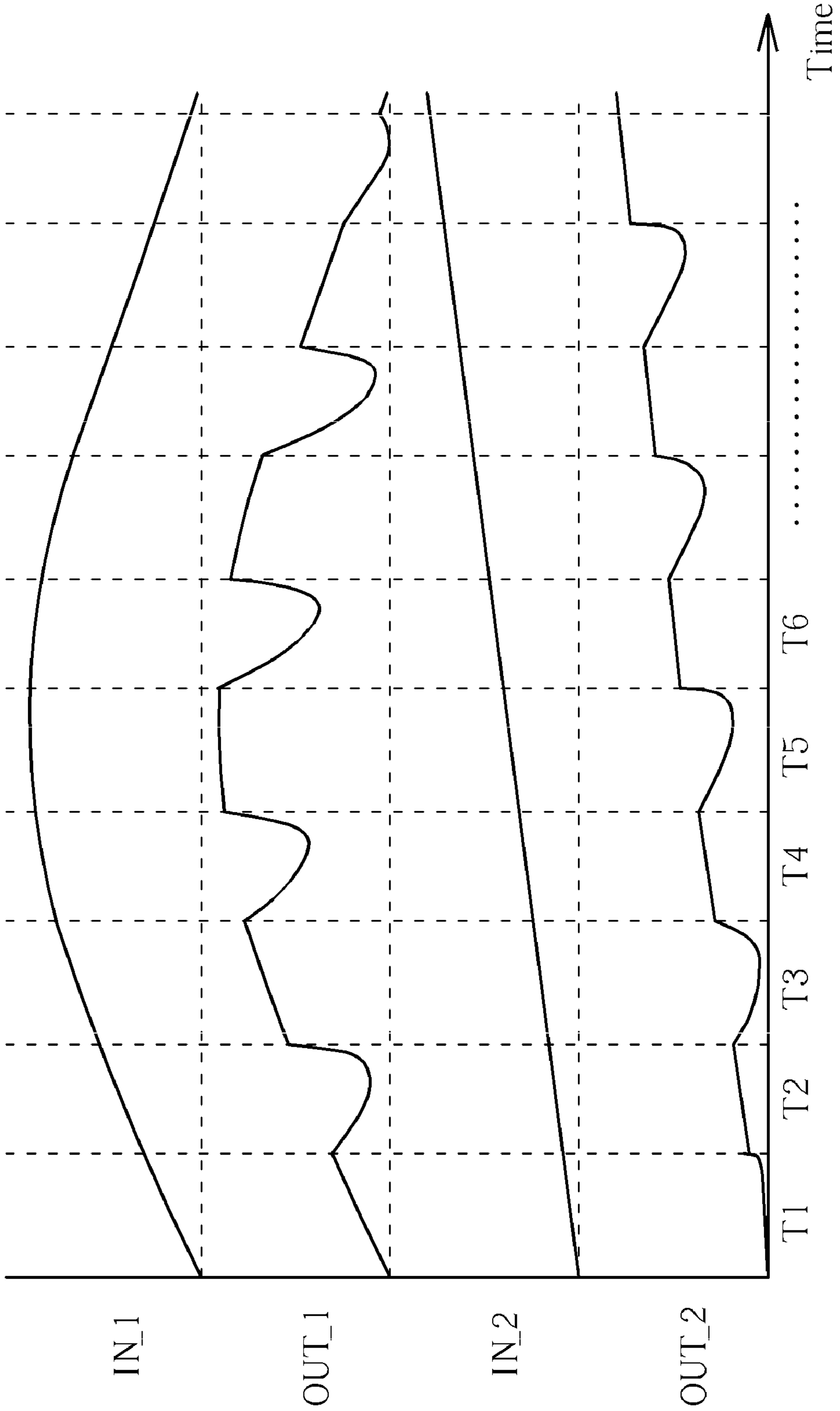
FIG. 4 is a schematic diagram of sound signals and corresponding amplifying results when the multi-channel output device shown in FIG. 2 is used for a stereo application.

In order to elaborate on the present invention, for an instance of stereo (n=m=2), please refer to FIG. 3 and FIG. 4. FIG. 3 is a schematic diagram when the multi-channel output device shown in FIG. 2 is used for a stereo application. FIG. 4 is a schematic diagram of sound signals and corresponding amplifying results when the multi-channel output device shown in FIG. 2 is used for the stereo application. As shown in FIG. 4, the control unit 206 controls the first switching unit 202 and the second switching unit 204 to switch coupling targets of the output end and the input end of the amplifier 200, which allows the multi-channel output device 20 to perform amplifying operations for both left-channel and right-channel signals (e.g. sound signals IN_1, IN_2) via a single amplifier. For example, within a time interval T1, the first switching unit 202 couples the reception end PI_1 to the input end of the amplifier 200, and the second switching unit 204 couples the sound output device PO_1 to the output end of the amplifier 200. Therefore, only the sound output device PO_1 receives the amplifying result OUT_1 of the sound signal IN_1. Then, within a time interval T2, the first switching unit 202 couples the reception end PI_2 to the input end of the amplifier 200, and the second switching unit 204 couples the sound output device PO_2 to the output end of the amplifier 200. Therefore, only the sound output device PO_2 receives the amplifying result OUT_1 of the sound signal IN_2. By the same token, the multi-channel output device 20 only needs the amplifier 200, and can implement a stereo output by switching coupling targets of the input end and the output end of the amplifier via the first switching unit 202 and the second switching unit 204. In comparison, in the prior (as shown in FIG. 1), the stereo output structure 10 needs two amplifiers to process left-channel and right-channel signals, which causes cost increase, larger chip size, and more power consumption.

To sum up, the present invention uses the first switching unit and the second switching unit to switch relationship between output and inputs, such that the multi-channel output device only needs a single amplifier to realize multi-channel output, in order to reduce cost, shrink chip size and decrease power consumption.

Those skilled in the art will readily observe that numerous modifications and alterations of the device and method may be made while retaining the teachings of the invention.

What is claimed is:

1. A multi-channel output device for a multimedia device comprising:

a plurality of reception ends for receiving a plurality of sound signals;

an amplifier comprising an input end and an output end, for amplifying signals received by the input end and outputting amplified signals from the output end;

a plurality of sound output devices for outputting sound according to received signals;

a first switching unit coupled between the plurality of reception ends and the input end of the amplifier, for coupling a reception end of the plurality of reception ends to the input end of the amplifier according to a control signal, wherein a switching frequency of the first switching unit switching the plurality of reception ends to be coupled to the input end of the amplifier is greater than a threshold value;

a second switching unit coupled between the output end of the amplifier and the plurality of sound output devices, for coupling the output end of the amplifier to a sound output device of the plurality of sound output devices according to the control signal, wherein a switching frequency of the second switching unit switching the output end of the amplifier to be coupled to the plurality of sound output devices is greater than a threshold value; and a control unit coupled to the first switching unit and the second switching unit, for outputting the control signal.

2. The multi-channel output device of claim 1, wherein an amount of the plurality of reception ends is not equal to an amount of the plurality of sound output devices.

3. The multi-channel output device of claim 1, wherein an amount of the plurality of reception ends is equal to an amount of the plurality of sound output devices.

4. The multi-channel output device of claim 1, wherein the threshold value is greater than a maximum frequency that human ears can distinguish.

5. The multi-channel output device of claim 1, wherein the threshold value is greater than a maximum frequency that human ears can distinguish.

6. The multi-channel output device of claim 1, wherein the plurality of sound output devices are a plurality of speakers.

7. The multi-channel output device of claim 1, wherein the plurality of sound signals are output from an audio processor of the multimedia device.

8. The multi-channel output device of claim 1, wherein the multimedia device is a headphone.

* * * * *